(12) United States Patent
Tzeng

(10) Patent No.: US 8,714,197 B2
(45) Date of Patent: May 6, 2014

(54) VALVE FOR WATER FAUCET AND METHOD FOR MANUFACTURING THE SAME

(75) Inventor: Jeffery Tzeng, Jiangmen (CN)

(73) Assignee: Dahata, Inc., Jiangmen (CN)

( * ) Notice: Subject to any disclaimer, the term of this patent is extended or adjusted under 35 U.S.C. 154(b) by 211 days.

(21) Appl. No.: 13/238,820

(22) Filed: Sep. 21, 2011

(65) Prior Publication Data

US 2012/0097276 A1    Apr. 26, 2012

(30) Foreign Application Priority Data

Oct. 22, 2010   (CN) ...................... 2010 2 0573302 U

(51) Int. Cl.
*E03C 1/04* (2006.01)
*B29C 45/14* (2006.01)
*F16K 27/00* (2006.01)

(52) U.S. Cl.
USPC .......... 137/603; 137/801; 137/315.12; 4/678; 264/250

(58) Field of Classification Search
USPC ................. 137/801, 315.12, 603, 606; 4/678; 264/250
See application file for complete search history.

(56) References Cited

U.S. PATENT DOCUMENTS

| | | | |
|---|---|---|---|
| 7,927,534 B1 * | 4/2011 | Seman et al. | 264/250 |
| 8,302,620 B2 * | 11/2012 | Lin | 137/315.12 |
| 2008/0196776 A1 * | 8/2008 | Ko | 137/603 |
| 2010/0096034 A1 * | 4/2010 | Hou | 137/801 |

* cited by examiner

*Primary Examiner* — Atif Chaudry
(74) *Attorney, Agent, or Firm* — Alston & Bird LLP

(57) ABSTRACT

The present invention provides a valve for water faucet including an outlet pipe seat having a connecting seat via a first injection molding, an outlet pipe connector assembled to the connecting seat, and a hot water valve seat and a cold water valve seat integrally wrapping around the outlet pipe seat and the outlet pipe connector via a second injection molding. Each water valve seat includes a copper pipe sleeve secured to a water inlet pipe. The outlet pipe seat is formed with leak-proof rings on an outer surface thereof. Each water valve seat is formed with a water inlet pipe having a positioning post thereon and an annular wall set around the water inlet pipe. The copper pipe sleeve defines a positioning hole for receiving the positioning post when the copper pipe sleeve is positioned in the chamber between the annular wall and the water inlet pipe.

3 Claims, 4 Drawing Sheets

VALVE FOR WATER FAUCET AND METHOD FOR MANUFACTURING THE SAME

CROSS-REFERENCE TO RELATED APPLICATION

The present patent application claims the benefit of Chinese Patent Application No. 201020573302.5, filed Oct. 22, 2010, the disclosure of which is hereby incorporated herein by reference in its entirety.

FIELD OF THE INVENTION

The present invention generally relates to water faucets and, more specifically, relates to a valve for water faucet and method for manufacturing the same.

BACKGROUND OF THE INVENTION

At present, conventional valves for water faucets in the prior art generally includes an outlet pipe seat, an outlet pipe connector and a hot water valve seat and a cold water valve seat manufactured via injection molding procedure. The hot water valve seat is provided with a hot water inlet pipe defining an external thread. The cold water valve seat is provided with a cold water inlet pipe defining an external thread.

However, the conventional valve for water faucet in the prior art at least has the following disadvantage. The cold water inlet pipe defining external thread and the hot water inlet pipe defining external thread may disengage or malfunction in use, which will inevitably reduce the life span of the valve for water faucet.

In view of the above, what is needed, therefore, is to provide a valve for water faucet having desirable life span.

SUMMARY OF THE INVENTION

One object of the present invention is to provide a valve for water faucet having desirable life span.

In accordance with one embodiment of the present invention, a valve for water faucet includes an outlet pipe seat having a connecting seat via a first injection molding, an outlet pipe connector assembled to the connecting seat, and a hot water valve seat and a cold water valve seat integrally wrapping around the outlet pipe seat and the outlet pipe connector via a second injection molding. Each water valve seat includes a water inlet pipe and a copper pipe sleeve secured to the water inlet pipe. The outlet pipe seat is formed with a number of leak-proof rings on an outer surface thereof. Each water valve seat is formed with a water inlet pipe having a positioning post thereon and an annular wall set around the water inlet pipe. The copper pipe sleeve is provided with a positioning hole for receiving the positioning post when the copper pipe sleeve is positioned in the chamber between the annular wall and the water inlet pipe.

According to one aspect of the present invention, the copper pipe sleeve is provided with a positioning notch, the water valve seat is provided with a positioning protrusion, and the positioning protrusion is received in the positioning notch.

According to one aspect of the present invention, the outlet pipe seat is formed with a number of positioning blocks, and the positioning blocks are located within the maximal profile of the outlet pipe seat.

The valve seat for water faucet according to one embodiment of the present invention at least has the following advantages relative to the prior art: engagement of the positioning post and the positioning hole can prevent the copper pipe sleeve from disengage from the water inlet pipe along the length direction thereof. Engagement of the positioning protrusion and the positioning notch can prevent the copper pipe sleeve from rotating relative to the copper pipe sleeve. The leak-proof rings on an outer surface of the outlet pipe seat can remarkably improve the life span of the valve for water faucet.

Another object of the present invention is to provide a method for manufacturing a valve for water faucet, which can improve the sealing performance of the faucet.

According to one aspect of the present invention, a method for manufacturing a valve for water faucet includes the steps of: providing an outlet pipe seat having a number of leak-proof rings at an outer surface thereof via a first injection molding, the outlet pipe seat including a connecting seat and a hot water pipe and a cold water pipe at two sides of the connecting seat; assembling an outlet pipe connector in the connecting seat; and positioning the outlet pipe seat coupled with the outlet pipe connector in an injection mould, and manufacturing a hot water valve seat and a cold water valve seat each secured with a copper pipe sleeve via a second injection molding.

According to one aspect of the present invention, the leak-proof rings are spaced apart from each other along the length direction of the outlet pipe seat.

According to one aspect of the present invention, at least part of the leak-proof ring melt during the second injection molding.

According to one aspect of the present invention, the outlet pipe seat is formed with a number of positioning blocks and the positioning blocks are located within the maximal profile of the outlet pipe seat.

Yet another object of the present invention is to provide an outlet pipe seat with desirable sealing performance.

According to one embodiment of the present invention, an outlet pipe seat for use in injection molding of a valve for water faucet includes a connecting seat and a hot water pipe and a cold water pipe seated at two sides of the connecting seat. The outlet pipe seat is provided with a number of leak-proof rings on an outer surface thereof According to one aspect of the present invention, the outlet pipe seat is formed with a number of positioning blocks, and the positioning blocks are located within the maximal profile of the outlet pipe seat.

According to one aspect of the present invention, the leak-proof rings are spaced apart from each other along the length direction of the hot water pipe and the cold water pipe.

According to one aspect of the present invention, at least part of the leak-proof ring melt during the second injection molding procedure.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Figure 1:
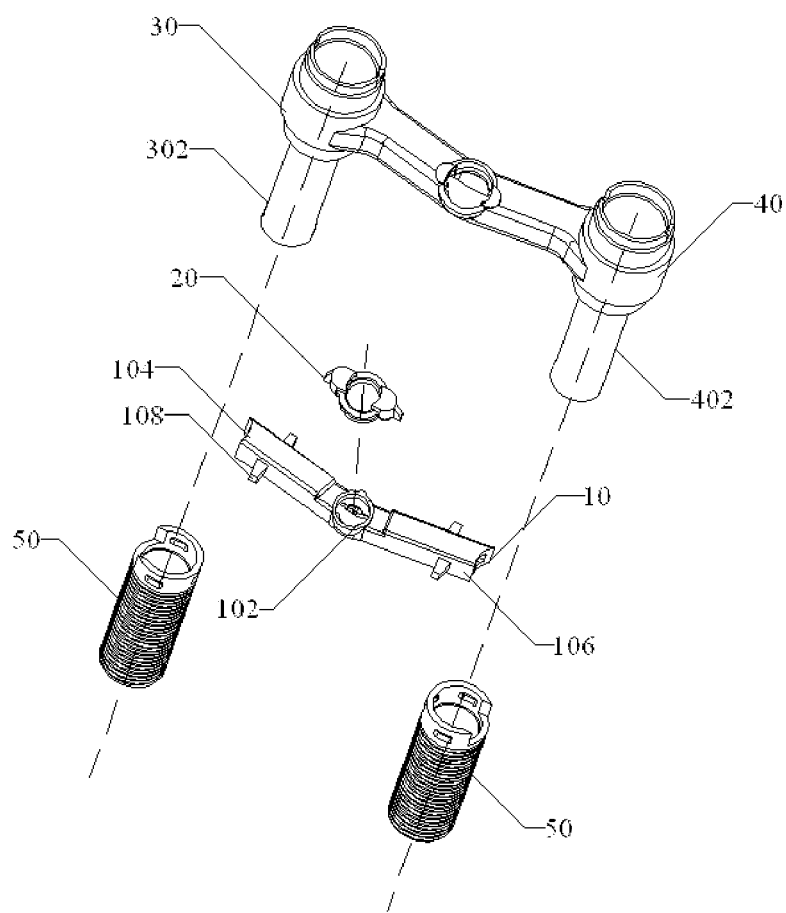
FIG. 1 depicts an exemplary exploded perspective view of a valve for water faucet according to one embodiment of the present invention.
Figure 2:
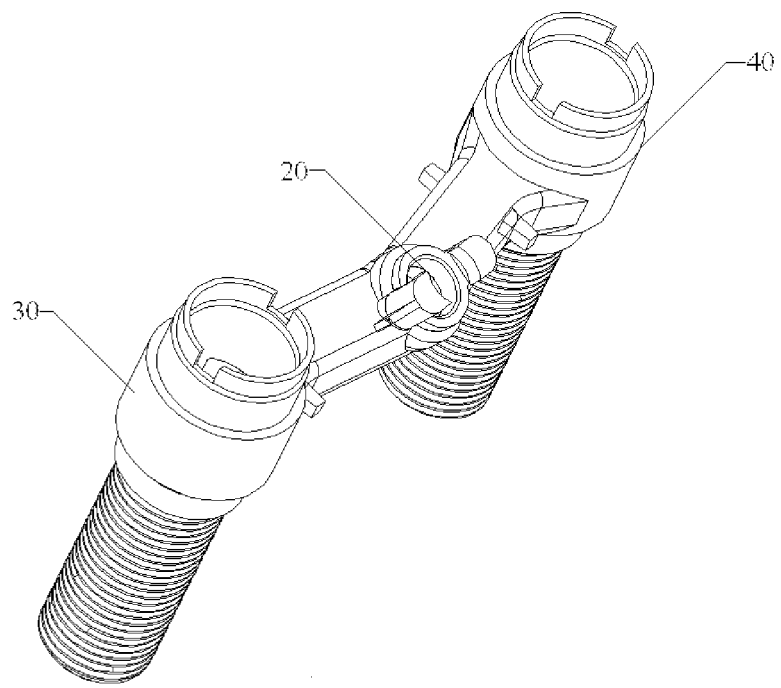
FIG. 2 depicts an exemplary assembled view of the valve for water faucet as shown in FIG. 1.

Referring to FIG. 1 to FIG. 6, according to a first embodiment of the present invention, a valve for water faucet includes an outlet pipe seat 10, an outlet pipe connector 20 coupled to the outlet pipe seat 10, a hot water valve seat 30 and a cold water valve seat 40 integrally wrapped around the outlet pipe seat 10 and the outlet pipe connector 20 via injection molding, and a pair of copper pipe sleeves 50 defining external threads respectively secured to the hot water valve seat 30 and the cold water valve seat 40.

Referring to FIG. 1, the outlet pipe seat 10 includes a connecting seat 102 at a center thereof and a hot water pipe 104 and a cold water pipe 106 at two sides of the connecting seat 102. The outlet pipe connector 20 is hermetically seated in the connecting seat 102 and has desirable sealing performance after injection molding. Outer peripheral wall of the hot water pipe 104 and the cold water pipe 106 is provided with a number of positioning blocks 108. The positioning blocks 108 can prevent the outlet pipe seat 10 from moving in the mould during the injection molding procedure.

Figure 3:
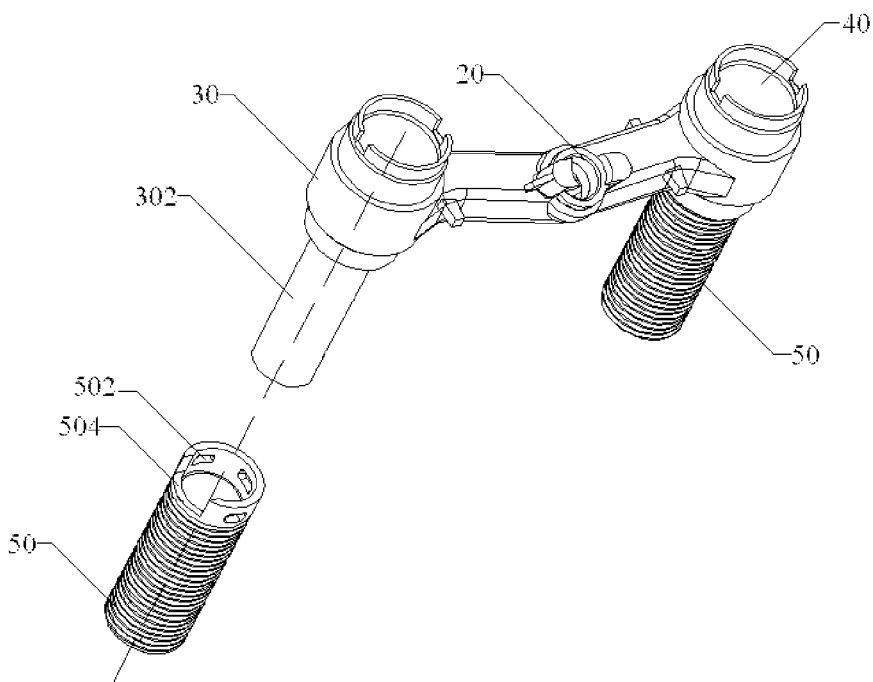
FIG. 3 depicts a partially assembled view of the valve for water faucet as shown in FIG. 1, wherein one of the copper pipe sleeves is disassembled from a hot water valve seat.
Figure 4:
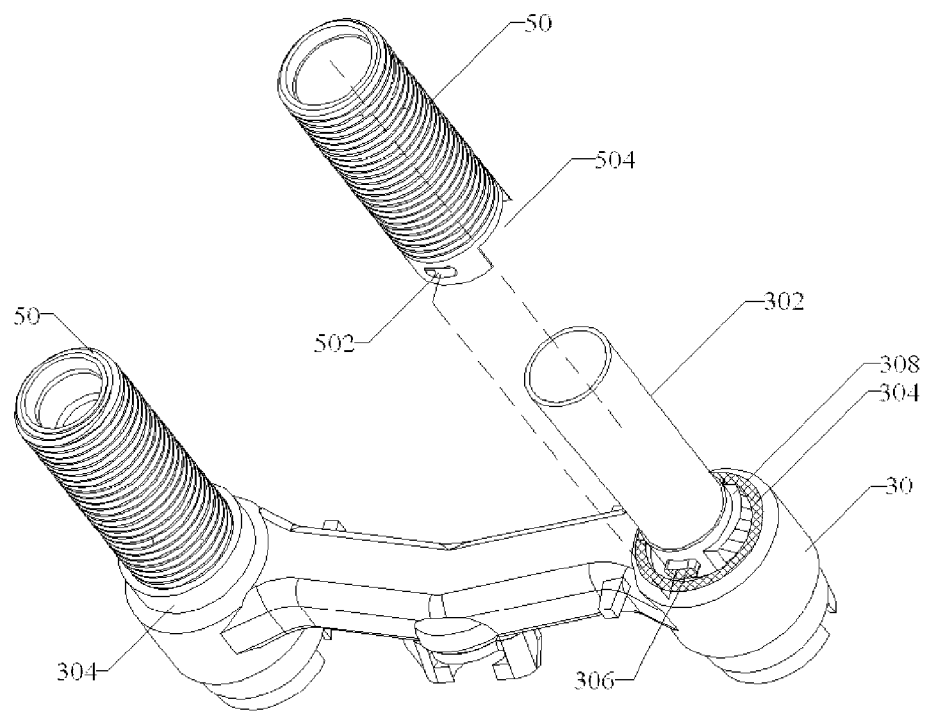
FIG. 4 depicts an another partially assembled view of the valve for water faucet as shown in FIG. 1.
Figure 5:
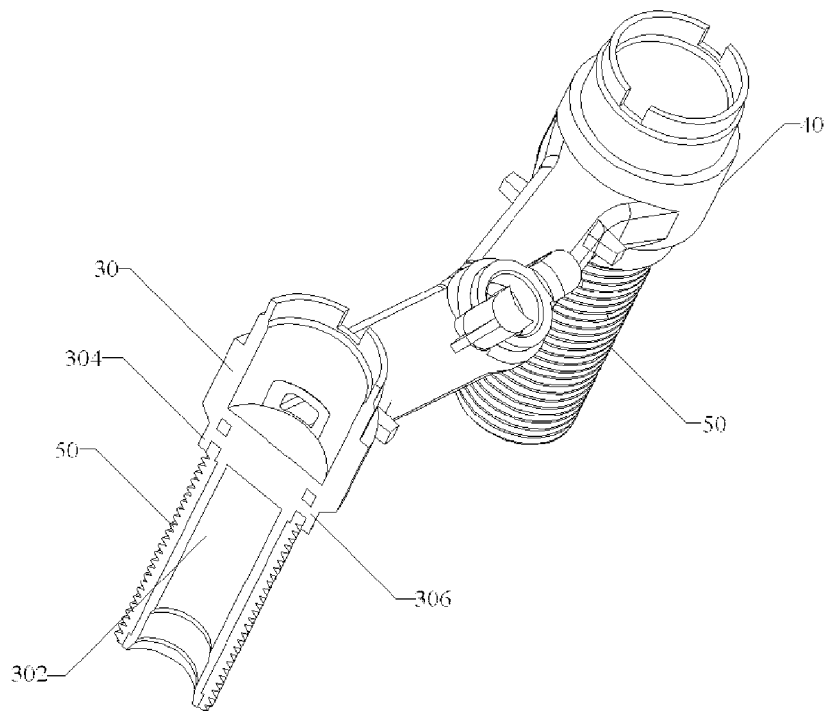
FIG. 5 depicts an exemplary perspective view of the valve for water faucet as shown in FIG. 2.
Figure 6:
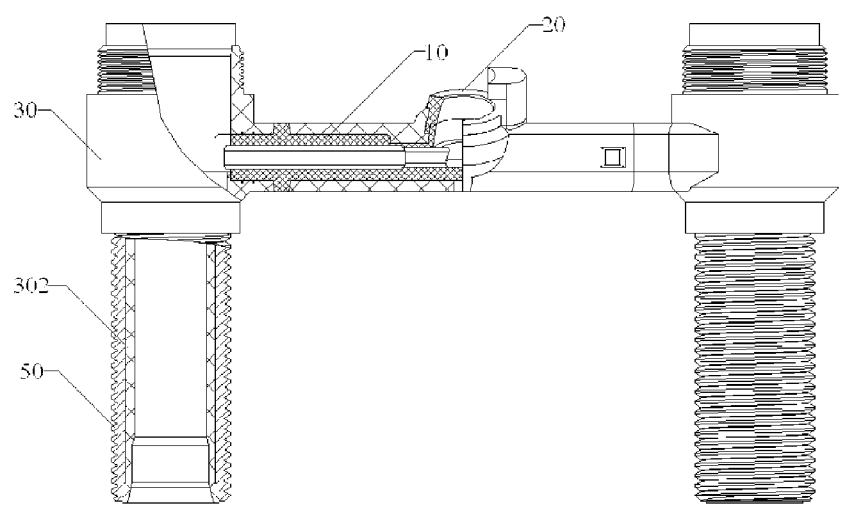
FIG. 6 depicts a partly cross-sectional view of the valve for water faucet as shown in FIG. 2.

Referring to FIG. 3 to FIG. 5, the hot water valve seat 30 and the cold water valve seat 40 are integrally wrapped around the outlet pipe seat 10 and the outlet pipe connector 20, so as to form desirable seal and avoid water leakage. The hot water valve seat 30 includes a hot water inlet pipe 302 and an annular wall 304 around the hot water inlet pipe 302. The hot water inlet pipe 302 is formed with a positioning post 306. A positioning protrusion 308 formed on the hot water valve seat 30 is seated in the chamber between the annular wall 304 and the hot water inlet pipe 302.

Referring to FIG. 3 to FIG. 5, the copper pipe sleeves 50 are hollow cylinders, which can be respectively secured to the hot water inlet pipe 302 and the cold water inlet pipe 402 via injection molding. The copper pipe sleeve 50 is provided with a positioning hole 502 extending therethrough, corresponding to the positioning post 306 on the outer surface of the hot water inlet pipe 302. The copper pipe sleeve 50 defines a positioning notch 504 corresponding to the positioning protrusion 308 seated in the chamber between the hot water inlet pipe 302 and the annular wall 304.

After assembly, the positioning post 306 on the outer surface of the hot water inlet pipe 302 is received in the positioning hole 502 defined in the copper pipe sleeve 50, so as to prevent the copper pipe sleeve 50 from being disengaged from the hot water inlet pipe 302 along the length direction thereof. The positioning protrusion 308 is received in the positioning notch 504 of the copper pipe sleeve 50, so as to prevent the copper pipe sleeve 50 from rotating relative to the hot water inlet pipe 302.

The copper pipe sleeve 50 defines external thread at an outer surface thereof, for connecting with other components of the water faucet.

Referring to FIG. 1 to FIG. 6, a method for manufacturing the valve for water faucet according to one embodiment of the present invention includes the steps detailed as following.

First, provides an outlet pipe seat 10 having a connecting seat 102 manufactured via a first injection molding.

Second, couple the outlet pipe connector 20 to the connecting seat 102 of the outlet pipe seat 10 while ensure desirable sealing performance between the outlet pipe connector 20 and the outlet pipe seat 10.

Third, the outlet pipe seat 10 coupled with the outlet pipe connector 20 is positioned in the injection mould as an inserting member. A copper pipe sleeve 50 is also positioned in the injection mould. The hot water valve seat 30 and the cold water valve seat 40 are manufactured via a second injection molding, so as to integrally wrap around the outlet pipe seat 10 and the outlet pipe connector 20 and further avoid water leakage at the conjunction of the outlet pipe seat 10 and the outlet pipe connector 20.

After the second injection molding procedure, the copper pipe sleeve 50 is positioned in the chamber between the hot water inlet pipe 302 and the annular wall 304. The positioning post 306 on the outer surface of the hot water inlet pipe 302 is received in the positioning hole 502 of the copper pipe sleeve 50. The positioning protrusion 308 is received in the positioning notch 504 of the copper pipe sleeve 50. Therefore, the copper pipe sleeve 50 can be securely coupled to the hot water inlet pipe 302 via injection molding.

It should be understood that, in the present invention, the hot water valve seat 30 and the cold water valve seat 40 have the same structure. Thus, in the embodiment as illustrated, the structure of the cold water valve seat 40 and coupling of the copper pipe sleeve 50 with the cold water valve seat 40 will not be further detailed.

Figure 7:
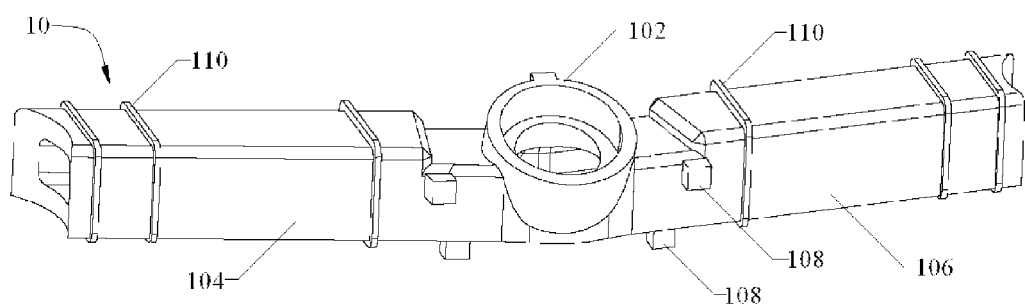
FIG. 7 depicts a perspective view of an outlet pipe seat for use in valve for water faucet according to a second embodiment of the present invention.

FIG. 7 depicts another perspective view of an outlet pipe seat 10 of a valve for water faucet according to a second embodiment of the present invention.

In the illustrated embodiment, the hot water pipe 104 and the cold water pipe 106 of the outlet pipe seat 10 each forms a number of annular leak-proof rings 110 which extend out from an outer surface thereof. The leak-proof rings 110 are spaced apart from each other along length direction of the hot water pipe 104 and the cold water pipe 106. In the second injection molding procedure, at least part of the leak-proof ring 110 melts, so as to improve the sealing performance of the valve for water faucet and prevent the valve for water faucet from leaking water.

In addition, in the second embodiment of the valve for water faucet of the present invention, the outlet pipe seat 10 is also disposed with a number of positioning blocks 108. However, the positioning blocks 108 are seated within the maximal profile of the outlet pipe seat 10. In other words, the positioning blocks 108 are formed on the most depressed portion of the outlet pipe seat 10, and distal end of each positioning block 108 does not extend out of the maximal profile of the outlet pipe seat 10. The outlet pipe seat 10 with positioning blocks 108 and the leak-proof rings 110 formed thereon are integrally wrapped in the second injection molding. At the same time, in the second injection molding, at least part of the leak-proof ring 110 melt, so as to prevent the manufactured faucet from leaking water.

Other features and method for manufacturing the valve for water faucet in accordance with the second embodiment of the present invention are the same as those described in the first embodiment of the present invention and, therefore, will not be further detailed.

In view of the previous detailed description of the embodiments of the present invention, the valve for water faucet of the present invention at least has the following advantages relative to those in the prior art.

Firstly, engagement of the positioning post 306 and the positioning hole 502 can prevent the copper pipe sleeve 50 from disengaging from the water inlet pipe (i.e. hot water inlet pipe 302 or the cold water inlet pipe 402) along the length direction thereof. Engagement of the positioning protrusion 308 and the positioning notch 504 can prevent the copper pipe sleeve 50 from rotating relative to the water inlet pipe (i.e. hot water inlet pipe 302 or the cold water inlet pipe 402). In view of the above, the copper pipe sleeve 50 can be coupled to the water inlet pipe (i.e. hot water inlet pipe 302 or the cold water inlet pipe 402) more securely and life span of the faucet can be remarkably improved.

Secondly, the outlet pipe seat 10 is provided with a number of leak-proof rings 110 spaced apart from each other along the length direction thereof. At least part of the leak-proof ring 110 melt in the second injection molding procedure, which can avoid water leakage in the use of the faucet.

Thirdly, the positioning blocks 108 provided on the outer surface of the valve pipe seat 10 are formed in the most recessed portion of the valve pip seat 10, which not only can prevent the outlet pipe seat 10 from moving during the second injection molding procedure, but also can reduce water leakage in the use of the faucet.

While the present invention has been illustrated by the above description of the preferred embodiments thereof, while the preferred embodiments have been described in considerable detail, it is not intended to restrict or in any way to limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A valve for water faucet, comprising:
    an outlet pipe seat having a connecting seat manufactured via a first injection molding;
    an outlet pipe connector assembled to the connecting seat; and
    a hot water valve seat and a cold water valve seat integrally wrapping around the outlet pipe seat and the outlet pipe connector via a second injection molding, each water valve seat comprising a water inlet pipe and a copper pipe sleeve secured to the water inlet pipe;
    wherein the outlet pipe seat is provided with a plurality of leak-proof rings on an outer surface thereof; and
    wherein each water valve seat is formed with a water inlet pipe having a positioning post thereon and an annular wall set around the water inlet pipe, and the copper pipe sleeve defines a positioning hole for receiving the positioning post when the copper pipe sleeve is positioned in a chamber between the annular wall and the water inlet pipe.

2. The valve for water faucet of claim 1, wherein the copper pipe sleeve is provided with a positioning notch, the water valve seat is provided with a positioning protrusion, and the positioning protrusion is received in the positioning notch.

3. The valve for water faucet of claim 1, wherein the outlet pipe seat is formed with a plurality of positioning blocks, and the positioning blocks are located within the maximal profile of the outlet pipe seat.

* * * * *